United States Patent [19]

Brewer et al.

[11] Patent Number: 5,459,831
[45] Date of Patent: Oct. 17, 1995

[54] METHOD FOR SELECTING GRAPHICAL OBJECTS IN QUADRANTS WITH A CURSOR

[75] Inventors: Eric A. Brewer; Mark B. Pinson, both of Granada Hills, Calif.

[73] Assignee: International Business Machines Corporation, Armonk, N.Y.

[21] Appl. No.: 319,336

[22] Filed: Oct. 6, 1994

Related U.S. Application Data

[63] Continuation of Ser. No. 819,250, Jan. 10, 1992, abandoned.

[51] Int. Cl.⁶ ........................................................ G06F 3/00
[52] U.S. Cl. ................................................................ 395/155
[58] Field of Search ................................... 395/135–161, 395/133–134, 120, 123, 118; 345/117–120, 147–150

[56] References Cited

U.S. PATENT DOCUMENTS

| | | | |
|---|---|---|---|
| 4,698,625 | 10/1987 | McCaskill et al. | 345/157 |
| 4,788,538 | 4/1987 | Klein et al. | 395/118 |
| 4,972,319 | 11/1990 | Delorme | 340/990 |

FOREIGN PATENT DOCUMENTS 0203324  3/1986  European Pat. Off. ........ G06F 15/72

OTHER PUBLICATIONS

Kedem, "The Quad–CIF Tree", ACM IEEE 19th Design Automation Conf., Jun. 1982, pp. 352–357.
Finkel et al, "Quad Trees", Acta Informatica, 1974, pp. 1–9.
Kuo et al, "A Data Structure For Fast Region Searches", IEEE Design & Test, 1989, pp. 20–28.
Ousterhout, "Corner Stitching", IEEE Trans. on CAD., Jan. 1984, pp. 87–100.
Bentley, "Multidimensional Binary Search Trees Used For Associative Searching", Com. of ACM, Sep. 1975, pp. 509–517.
Rosenberg, "Geographical Data Structures", IEEE Trans. on CAD, Jan. 1985, pp. 54–67.
Hsiao et al, "Using a Multiple Storage Quad Tree on a Hierarchical VLSI Compaction Scheme", IEEE Trans. on CAD, May 1990, pp. 522–536.
Pitaksanonkul et al, "Comparisons of Quad Trees", IEEE Trans. on CAD, Nov. 1989, pp. 1157–1164.
Srinivas et al, "YAQT", IEEE Int. Symp. on VLSI, Jan. 1991, pp. 302–309.
Hsiao et al, "An edge–oriented Compaction Scheme Based on Multiple Storage Quad Tree", 1 SCAS '88, Jun. 1988, pp. 2435–2438.
Li et al, "Two–Layer Quad Trees", IEEE Int. Conf. on CAD, Nov. 1988, pp. 530–533.
Banerjee et al, "Supporting VLSI Geometry Operations in a Database System", 1986, pp. 409–415.
Berger, "Quad–Tree Hierarchy for Circuit Data Retrieval in Structured Design", IEEE Int. Conf. on Computer Design, Oct. 1985, pp. 650–653.
Brown, "Multiple Storage Quad Trees", IEEE Trans. on CAD, Jul. 1986, pp. 413–419.

(List continued on next page.)

*Primary Examiner*—Mark R. Powell
*Assistant Examiner*—John E. Breene
*Attorney, Agent, or Firm*—David J. Kappos; L. Bruce Terry; Andrew J. Dillon

[57] ABSTRACT

A technique for organizing graphical objects in a graphics database that facilitates the rapid selection of one or more graphical objects on a computer display screen. Graphical objects are stored in the graphics database using a spatially organized data structure. The spacially organized data structure is formed by recursively subdividing the graphics space until each subspace contains no more than a predetermined number of graphical objects. The spacially organized database is ideally suited for spacial queries required to select, based on visual criteria, graphical objects appearing on a display screen. Graphical objects may be selected in response to a cursor moving about a display screen under programmer control, or in response to a system request to identify one or more objects spacially located in a given portion of the graphics space.

3 Claims, 6 Drawing Sheets

OTHER PUBLICATIONS

R. Williams, "The Goblin Quadtree," The Computer Journal, vol. 31, No. 4, Aug. 1988, pp. 358–363.

M. Slater, A. Davison et al., "Liberation from Rectangles: a tiling method for dynamic modification of objects on raster displays," EUROGRAPHICS '88.

A. Hutflesz, H. W. Six et al., "The R–File: An Efficient Access Structure for Proximity Queries," Proceedings Of The Sixth International Conference On Data Engineering, Los Angeles, Calif., Feb. 5, 1990, pp. 372–379.

METHOD FOR SELECTING GRAPHICAL OBJECTS IN QUADRANTS WITH A CURSOR

This is a continuation, of application Ser. No. 07/819,250, filed Jan. 10, 1992, now abandoned.

FIELD OF THE INVENTION

The present invention relates generally to graphical data organization in a computer system, and more particularly to improving the performance of graphical object selection and display. The invention has particular application in computer aided design (CAD) systems, but also can be advantageously applied to illustration systems and desktop publishing systems.

Background of the Invention

Graphics Database Organization

Graphics database applications such as those used in CAD systems are traditionally organized on the basis of graphical object type, the order of graphical object creation, and the layer on which the graphical object exists. However, some of the most fundamental interactions with graphics databases require queries based on the spacial location of the graphical objects making up the database. Servicing such interactions under the paradigm of the prior art requires extensive searching through the underlying database, which is randomly organized vis-a-vis location-based queries. As the database becomes large, these queries exact a significant penalty on system performance, including noticeable delays in system response time. Thus, the typical graphics database organization does not lend itself to graphical object selection queries based on object location.

Important graphics database interactions requiring location-based queries include user selection of graphical objects appearing on a display screen and system selection of graphical objects located in a given region of a graphics space. Both of these types of interactions are discussed in more detail below.

User Selection of Graphical Objects

User selection of a single graphical object on a display screen is typically accomplished by positioning a pointing cursor near the desired object and pressing the select button. The graphics database is then searched and distance computations are performed to find the object that was closest to the cursor when the select button was pressed. This approach is adequate when there are only a few objects to pick from. However, as the number of objects increases the system's task becomes increasingly processor consumptive.

In some systems, as soon as an object is found that is within a predetermined distance from the cursor location, that object is selected and the search is terminated. This method has better average performance than a complete search of all graphical objects, but still may not be fast if the number of objects is large and the desired object is near the end of the list. Also, since the system may not select the correct object initially, the user may have to position the cursor very carefully or zoom in to make the desired selection.

Part of the problem is minimized if the system searches a data structure containing the graphical objects on the display each time the cursor is repositioned and identifies the object that would be selected if the select button were pressed (preselection). One known approach is to identify the object that would be selected by using various types of highlighting. Although this technique reduces the burden on a user, it dramatically increases the burden on the system because of the need for constant searching. Thus, as the number of objects increases, this approach suffers from the increased overhead associated with preselecting objects. In another approach for object selection, a user selected X,Y location on the display is used as an initial seed location and a radial search is conducted using the initial X,Y location as the center of the search. This technique is an example of a resource intensive solution that does not organize information to optimize selection of objects on a display.

The difficulty of quickly selecting among increasing numbers of objects increases linearly as the number of objects increases. Also, unless the feedback is nearly instantaneous from the user-perception point of view, the selection method hinders users. In a typical CAD drawing there may be thousands of objects; in such an environment, the object selection techniques contemplated by the prior art are not capable of providing nearly-instantaneous feedback.

Sometimes a user may need to select multiple objects. If many objects are to be selected, it is inconvenient to select the objects one-by-one as described above. Thus, it becomes desirable for a graphical editing system to provide support for multiple object selection. Examples include selecting all objects that are within a rectangle or selecting all objects intersecting a line. After the rectangle or line is defined by a user, the graphics database is searched and calculations are performed for each object on the display to determine whether the object is within the rectangle or intersects the line, respectively. Again, as is the case for single object selection, this can be a slow process if a large number of objects are involved.

System Selection of Graphical Objects

There are a variety of circumstances in which it is desirable for a display system to select for itself certain graphical objects from a larger set of graphical objects, including: selection of all objects that are on the visible window for display; selection of all objects whose images are damaged when overlapping objects are erased from the display; and selection of all objects whose image must be re-drawn when an obscuring window is removed. The alternatives to selection—processing all objects in the graphics space or redrawing all visible objects—require unnecessary computations and I/O and hence suffer significant performance penalties.

The purpose of selection, then, is to improve performance in each of these examples. However, because prior art graphics databases are not spacially organized, the selection process itself is time consuming. Further, as the number of graphical objects in the graphics database increases, the time required to perform the selection increases, since the entire database must be searched to find all the sought-after objects. Thus, in modern graphics database applications (such as CAD applications) involving many objects, system-initiated selection of graphical objects can inhibit user productivity as much or more than user-initiated selection.

Objects of the Invention

It is therefore an object of the present invention to organize graphical objects in a graphics database according to their spacial location.

It is another object of the present invention to provide selection of graphical objects from a graphics database by performing a spacial query.

It is another object of the present invention to provide a method for selecting from a graphics database graphical objects pointed to by a cursor on a display.

It is another object of the present invention to provide a method for selecting from a graphics database graphical objects in a region of a graphics space.

SUMMARY OF THE INVENTION

In accordance with the present invention, a computer display system is provided with a scheme for organizing the graphical objects forming a graphics space in a graphics database such that single objects and groups of objects can be efficiently identified in response to spacial queries on the graphics database. A spacially organized data structure is created in a computer memory. The graphical objects making up a graphics space are mapped into the spacially organized data structure using a recursive subdivision of space integrated with a display list stored in the data structure.

Information on a display becomes readily accessible to a user by translating cursor pointings into a candidate object or objects to select. The translation is accomplished quickly and accurately by performing spacial queries on the spacial data structure previously formed in the computer memory. The candidate object or objects are communicated back to the user via highlighting or other user perceptible indicia such as blinking, inverse video, pointers, etc.

Information on a display also becomes readily accessible to a program by translating a region identified by the program into an object or objects to select for subsequent processing. The translation is likewise accomplished by performing spacial queries on the spacially organized graphics database. The object or objects selected are communicated back to the requesting program for subsequent manipulation such as display or removal of all objects within a visible window, redraw of objects damaged when overlapping objects are erased from the display, or redraw of overlapping objects when an obscuring window is removed.

DETAILED DESCRIPTION OF THE INVENTION

Figure 1:
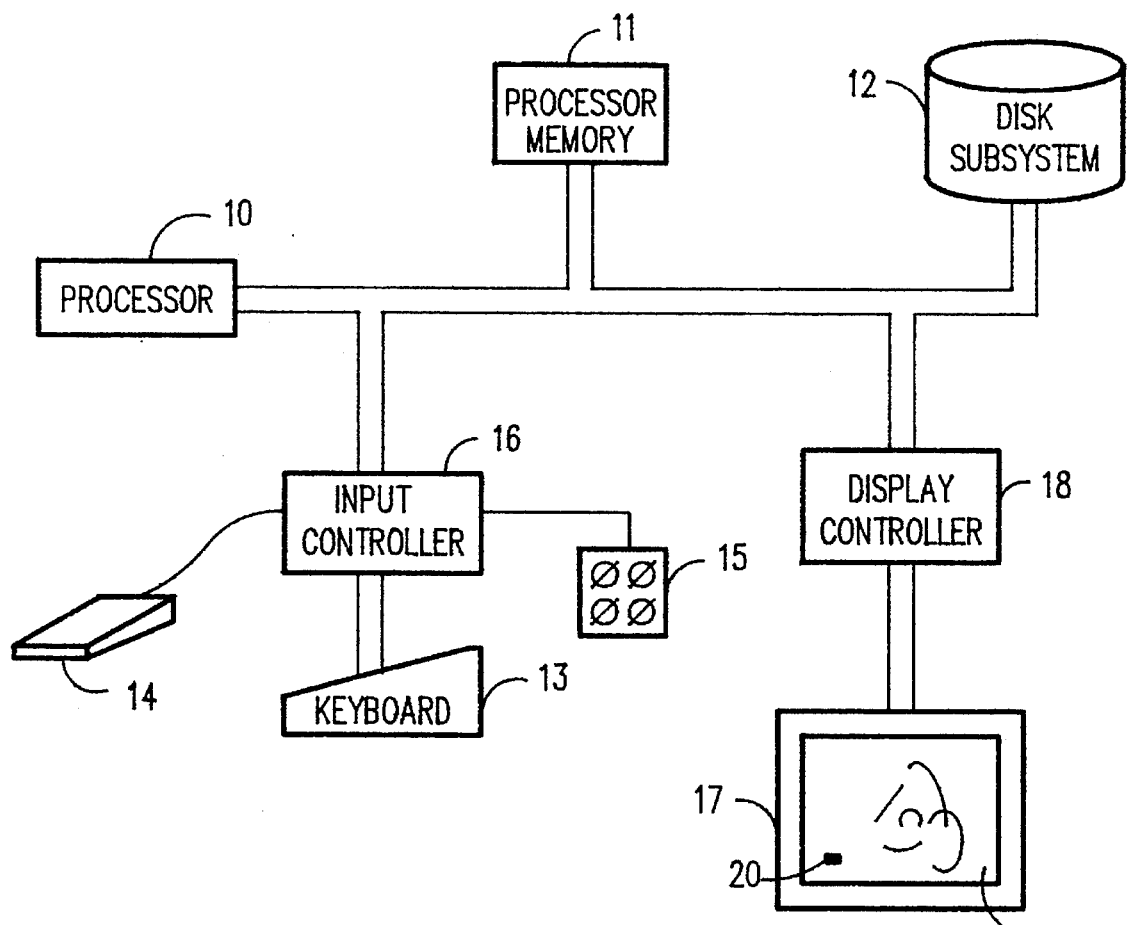
FIG. 1 is a block diagram illustrating a computer hardware system including a display screen on which is displayed several graphical objects in accordance with the present invention.

Shown in FIG. 1 is a computer hardware system configured to implement the present invention. Processor means 10 executes programs and manipulates data (including the graphics database containing the spatially organized graphics space of the present invention) stored in a memory means, which may include any combination of processor memory 11 and disk subsystem 12. In the preferred embodiment, portions of the graphics database presently accessible for visual display or use by the processor are typically held in processor memory 11, while portions not in use are stored in disk subsystem 12. User input is entered through keyboard 13, mouse 14, and dial pad 15, all managed by input controller 16. Drawings are presented for user-viewing on display means 17, managed by display controller 18. In the preferred embodiment, display means 17 is an all-points-addressable graphics display screen. Shown in display space 19 is an exemplary CAD drawing including a group of graphical objects. Also shown is display cursor 20, manipulable by way of keyboard 13, mouse 14 or dial pad 15. It is to be noted that display 19 at any given time may contain an entire graphics space (e.g. an entire CAD drawing) or only part of a graphics space (e.g. where a CAD drawing is viewed at a resolution such that the entire drawing will not fit in the display space).

Spacial Organization of a Graphics Database

In accordance with the present invention, the graphical objects contained in a graphics space are organized into a database according to their spacial locations in the graphics space. Initially, the graphics space is divided into a plurality of smaller regions; in the preferred embodiment, quadrants are used to simplify calculations. For each quadrant, a list is formed of the objects that are wholly or partly within that quadrant. If there are more than N objects in the quadrant (where N is the predetermined maximum number of objects for which spacial calculations can be performed without impacting user response time), the quadrant is recursively subdivided into four additional quadrants until the new quadrants contain no more than N objects. When the entire process is complete, the graphics space is organized into a database containing lists of objects (display lists), each display list identifying all objects intersecting a particular quadrant, each quadrant accessible according to its physical position in the graphics space.

It is to be noted that N is a value determined empirically as a function of the processing power of the computer on which the present invention is to be implemented. In the preferred embodiment, a value of N=32 has been found to produce optimal results for subsequent spacial queries.

Figure 2:
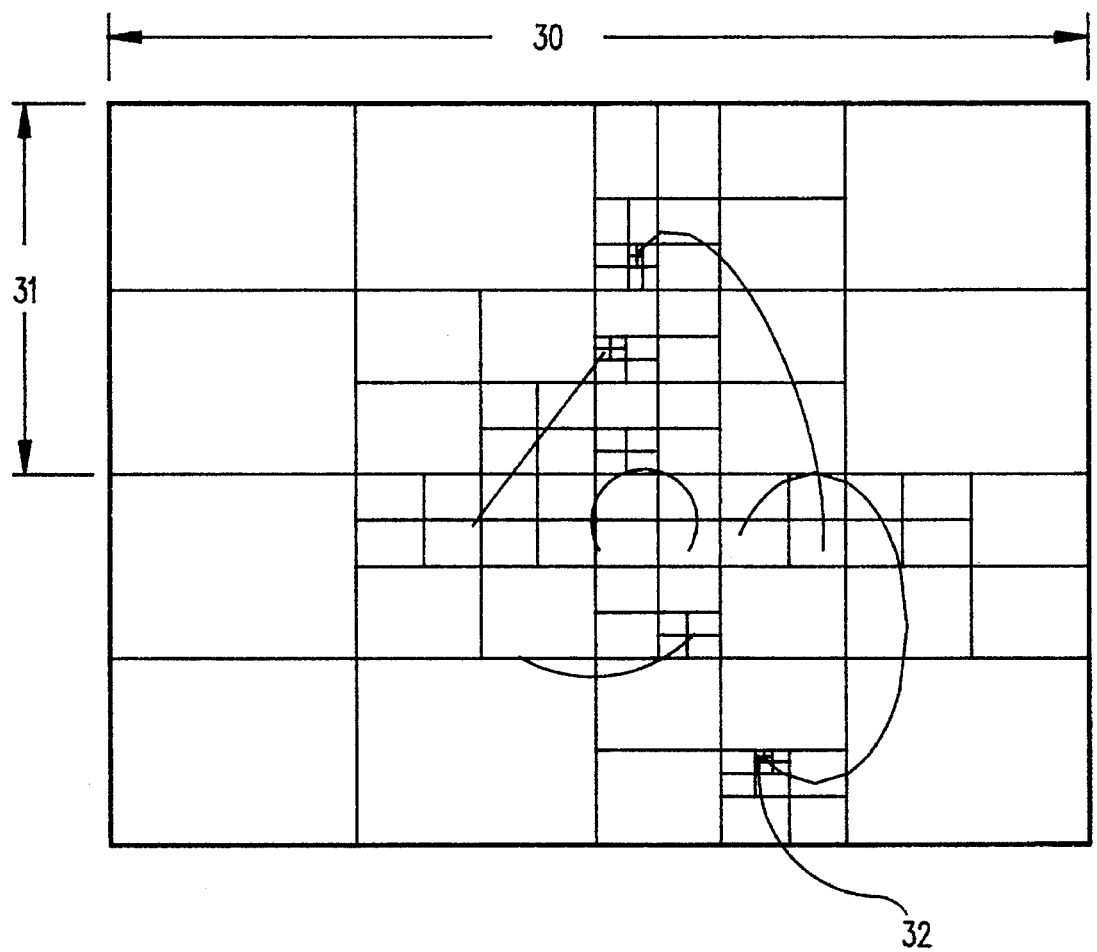
FIG. 2 is a diagram illustrating a data structure organized according to a recursive subdivision of space in accordance with the present invention.

FIG. 2 illustrates a view of an exemplary graphics space with quadrants subdivided into additional quadrants. The graphics space is in the form of a square having sides 30. Each initial quadrant is in the form of a square having sides 31. The finest granularity recursive subdivision is exemplified by square 32.

The preferred embodiment logic for recursively subdividing a graphics space and simultaneously inserting each object in a box (quadrant) or boxes having appropriate granularity and spacial coordinates is illustrated in PROCEDURE subdivide, set forth below. Procedure insert_object, which is called by PROCEDURE subdivide, is set forth following PROCEDURE subdivide.

Figure 3:
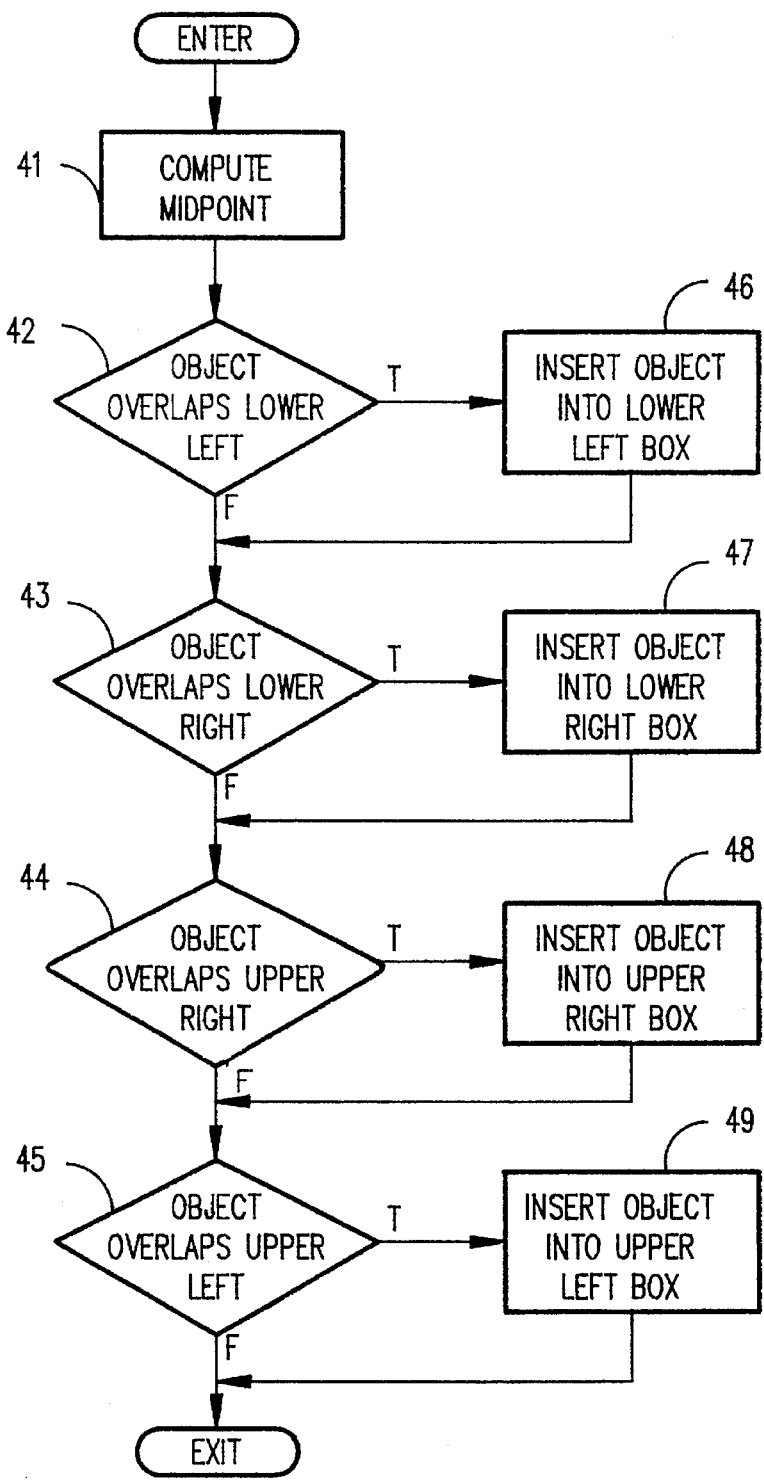
FIG. 3e is a flow chart setting forth the logic for PROCEDURE subdivide inaccordance with the present invention.
Figure 4:
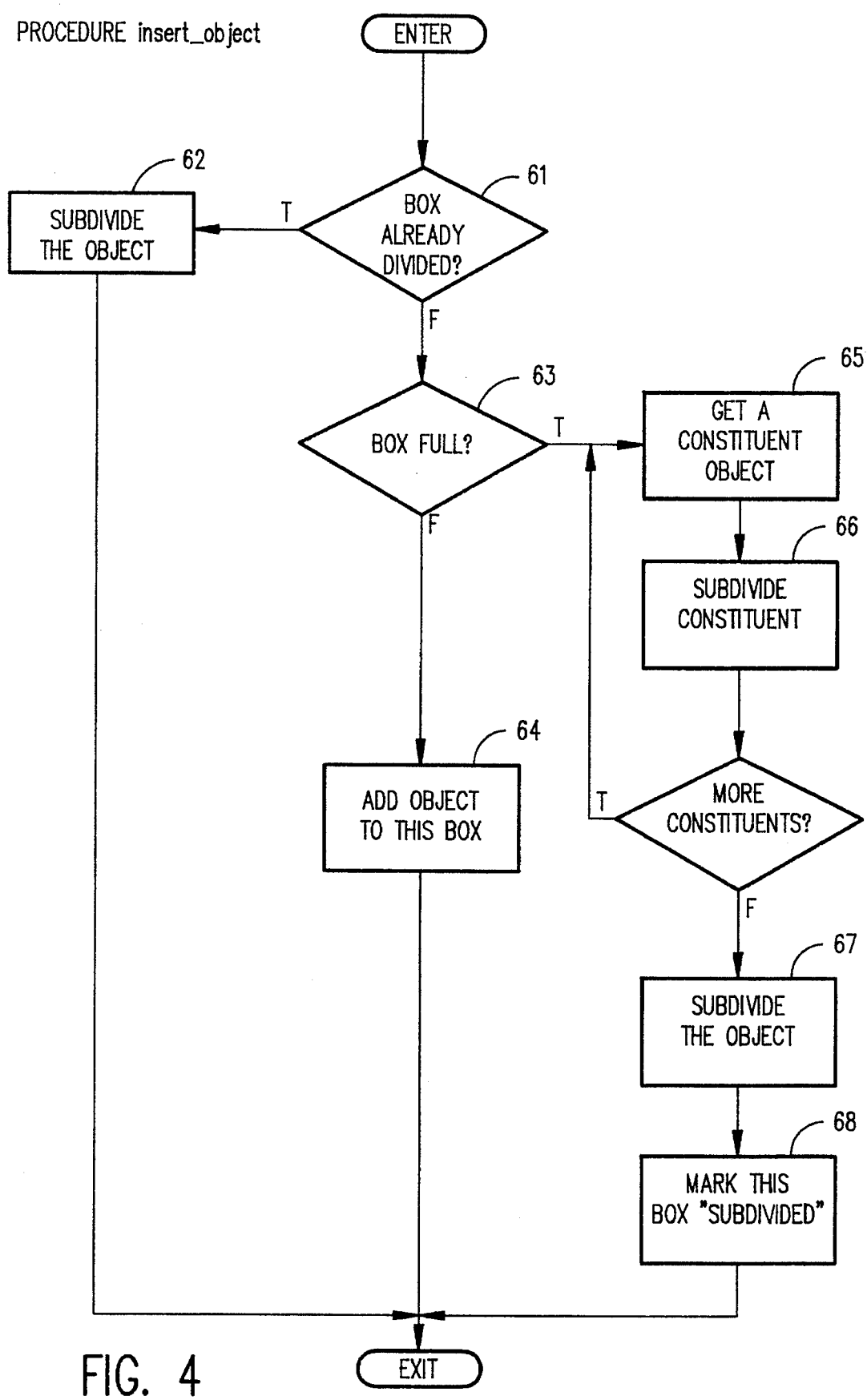
FIG. 4 is a flow chart setting forth the logic for PROCEDURE insert_object in accordance with the present invention.

Both PROCEDURE subdivide and PROCEDURE insert_object are most readily understood with reference to FIGS. 3 and 4, respectively. As shown in FIG. 3, PROCEDURE subdivide begins at 41 by computing the midpoint of the rectangle in which it will attempt to place an object. At 42–45, the coordinate description of the object is compared to the midpoint to determine whether any portion of the object resides in any of the four quadrants (boxes) making up the rectangle. At 46–49 PROCEDURE insert_object is called to insert the object into the appropriate box or boxes.

As shown in FIG. 4, PROCEDURE insert_object begins at 61 by determining whether the present box has been subdivided already. If so, the object is subdivided at 62 by calling PROCEDURE subdivide recursively. If not, the present box is checked at 63 to determine if it is full. If not, the object is simply added to the box at 64 and PROCEDURE insert_object is exited. If the box is full, then each constituent object (each object in the box) is extracted in rum at 65 and subdivided at 66 by calling PROCEDURE subdivide recursively. Once all the constituent objects have been subdivided, the object is subdivided at 67 and marked "subdivided" at 68 to prepare for test 61 to be executed on a future call of PROCEDURE insert_object.

the level of the undivided graphics space, comparing the midpoint of the current box to the coordinates of a query target (e.g. a cursor position) or a target characteristic (e.g. all objects residing in a given region of the graphics space) after each subdivision, until an indivisible box containing the query target or target characteristic is reached. If the query target or target characteristic encompasses more than one point, the above technique is applied to each quadrant containing part of the query target or target characteristic.

Figure 5:
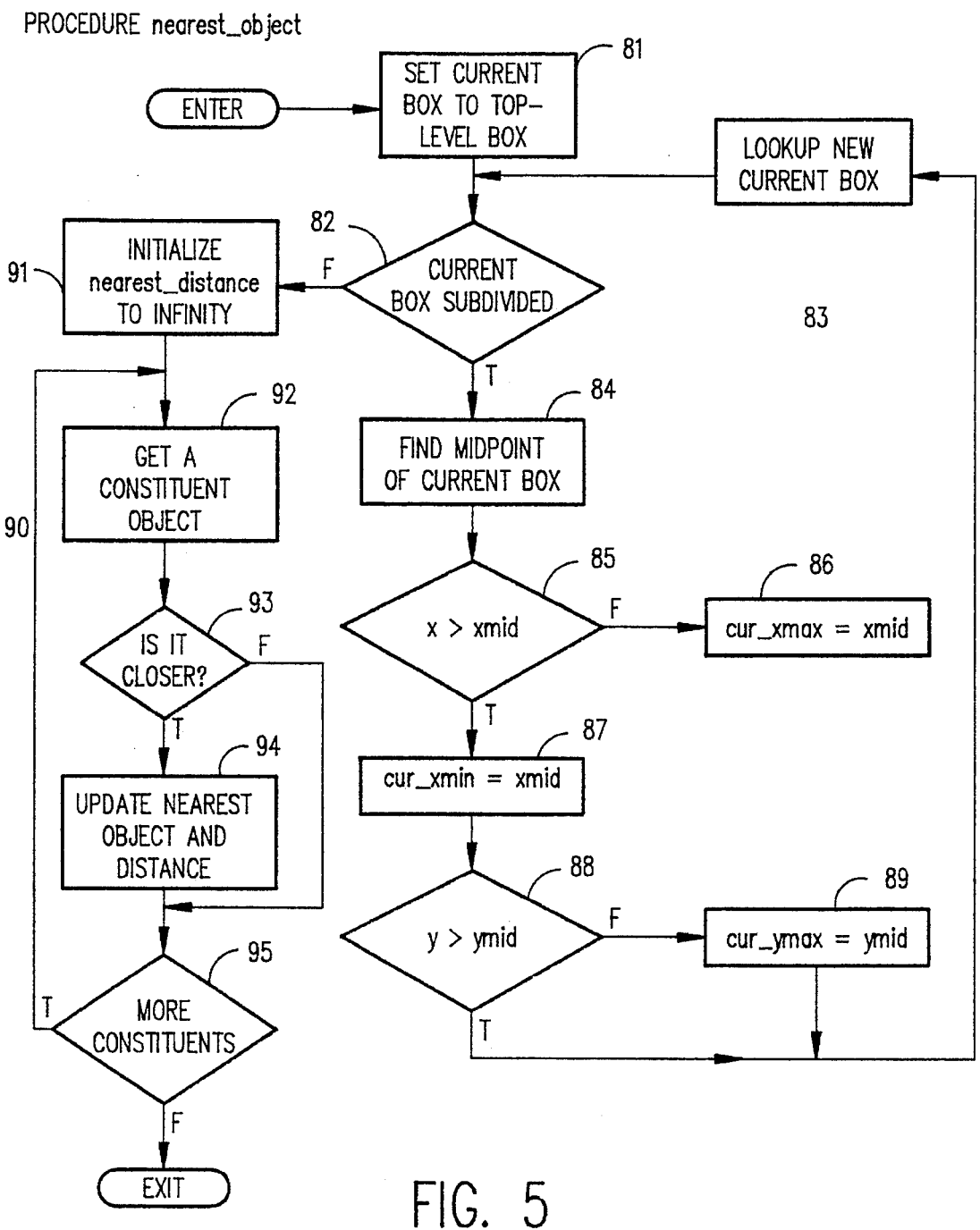
FIG. 5 is a flow chart setting forth the logic for PROCEDURE nearest_object in accordance with the present invention.

The preferred embodiment logic for finding the object nearest a given point (query target) is set forth below in PROCEDURE nearest_object. A flowchart representation of PROCEDURE nearest_object is set forth in FIG. 5. Referring to FIG. 5, PROCEDURE nearest_object begins at 81 by initializing the current box to the entire graphics space. This ensures that, absent error, the query target is

```
PROCEDURE subdivide(object, xmin, ymin, xmax, ymax)
****************************************************
* PURPOSE:   Compute which of the four quadrants this object
*            overlaps and insert the object into each of those
*            quadrants that the object overlaps
* INPUT:     The object and the boundary of the current
*            rectangle
* OUTPUT:    None
****************************************************
* Compute the midpoint of the rectangle
        xmid = (xmin + xmax) / 2
        ymid = (ymin + ymax) / 2
* For each quadrant, see if object overlaps it; if so insert the
* object into the quadrant
        IF (object overlaps rectangle [xmin, ymin, xmid, ymid]) THEN
          insert_object(object, xmin, ymin, xmid, ymid)
        ENDIF
        IF (object overlaps rectangle [xmid, ymin, xmas, ymid]) THEN
          insert_object(object, xmid, ymin, xmax, ymid)
        ENDIF
        IF (object overlaps rectangle [xmid, ymid, xmax, ymax]) THEN
          insert_object(object, xmid, ymid, xmax, ymax)
        ENDIF
        IF (object overlaps rectangle [xmin, ymid, xmid, ymax]) THEN
          insert_object(object, xmin, ymid, xmid, ymax)
        ENDIF
        END PROCEDURE subdivide
PROCEDURE insert_object(object, xmin, ymin, xmax, ymax)
****************************************************
* PURPOSE:   Insert the object into box [xmin, ymin, xmax, ymax]
* INPUT:     the object and the boundary of the box
* OUTPUT:    none
****************************************************
* determine if this box has been subdivided, if so subdivide the object
        IF (box already subdivided) THEN
             CALL subdivide(object, xmin, ymin, xmax, ymax)
* If not subdivided, then determine if the box is full. If full, then
* subdivide all the constituent objects and the object to be added
        ELSEIF (box is full) THEN
             REPEAT for each constituent object
                get constituent_object
                CALL subdivide(constituent_object, xmin, ymin, xmax, ymax)
             ENDREPEAT
             CALL subdivide(object, xmin, ymin, xmax, ymax
             Mark box as "subdivided"
* if the box is not full, simply add the object to this box
        ELSE
             Add object to this box
        ENDIF
             END PROCEDURE insert_object
```

Spacial Queries

Once the graphics database has been spacially organized, searches based on object location (spacial queries) can be conducted with great efficiency. To perform a spacial query, the graphics space is successively subdivided, starting from some place within the current box. At 82, subdivision of the current box into the smallest (indivisible) box containing the query target is begun. The subdivision process is designated generally by 83, and includes: finding the midpoint of the current box at 84; reducing the current box to the quadrant in which the query target lies at 85-89; and iterating on 82-89 until the smallest box containing the query target is found.

Having determined which box the query target is in, PROCEDURE nearest_object continues by picking the closes object within the box. Designated generally by 90, this process includes initializing the nearest_distance to infinity at 91 and then checking the distance between each object in the quadrant and the query target against nearest_distance, retaining the lesser of nearest_distance and the checked distance at each comparison (92-95).

containing at least one of the sought-after objects is found.

Having found an indivisible quadrant containing at least one of the sought-after objects, PROCEDURE rectangle_find continues by applying the desired procedure "f" to each object that is a constituent of the indivisible quadrant. Designated generally by 112, this process includes: extracting a constituent object from the indivisible quadrant at 113; checking whether it has already been processed through procedure "f" at 114, and if not previously processed, applying procedure "f" at 115 and marking the constituent

```
PROCEDURE nearest_object(x,y)
***************************************************
* PURPOSE:   Find the nearest object to the point (x,y)
* INPUT:     the point (x,y)
* OUTPUT:    the nearest object
***************************************************
* Initialize current box to the top level box; assumes that
* point is inside the top level box
        cur_xmin = root_xmin
        cur_ymin = root_ymin
        cur_xmax = root_xmax
        cur_ymax = root_ymax
* refine box until we get to a non-subdivided box
        DO WHILE (current box is not subdivided)
* find midpoint of the current box
        xmid = (cur_xmin + cur_xmax) / 2
        ymid = (cur_ymin + cur_ymax) / 2
* reduce the current box to the quadrant in which the point lies
        IF (x > xmid) THEN
                cur_xmin = xmid
        ELSE
                cur_xmax = xmid
        ENDIF
        IF (y > ymid) THEN
                cur_ymin = ymid
        ELSE
        ENDIF
                cur_ymax = ymid
ENDWHILE
* at this point, the box has objects in it; pick the closest object
        nearest_distance = infinity
        REPEAT for each constituent object
            get constituent_object
            IF    (distance to constituent_object < nearest_distance_ THEN
                nearest_distance = distance to constituent_object
                nearest_object = constituent_object
                    ENDIF
            ENDREPEAT
            RETURN nearest_object
        END PROCEDURE nearest_object
```

Figure 6:
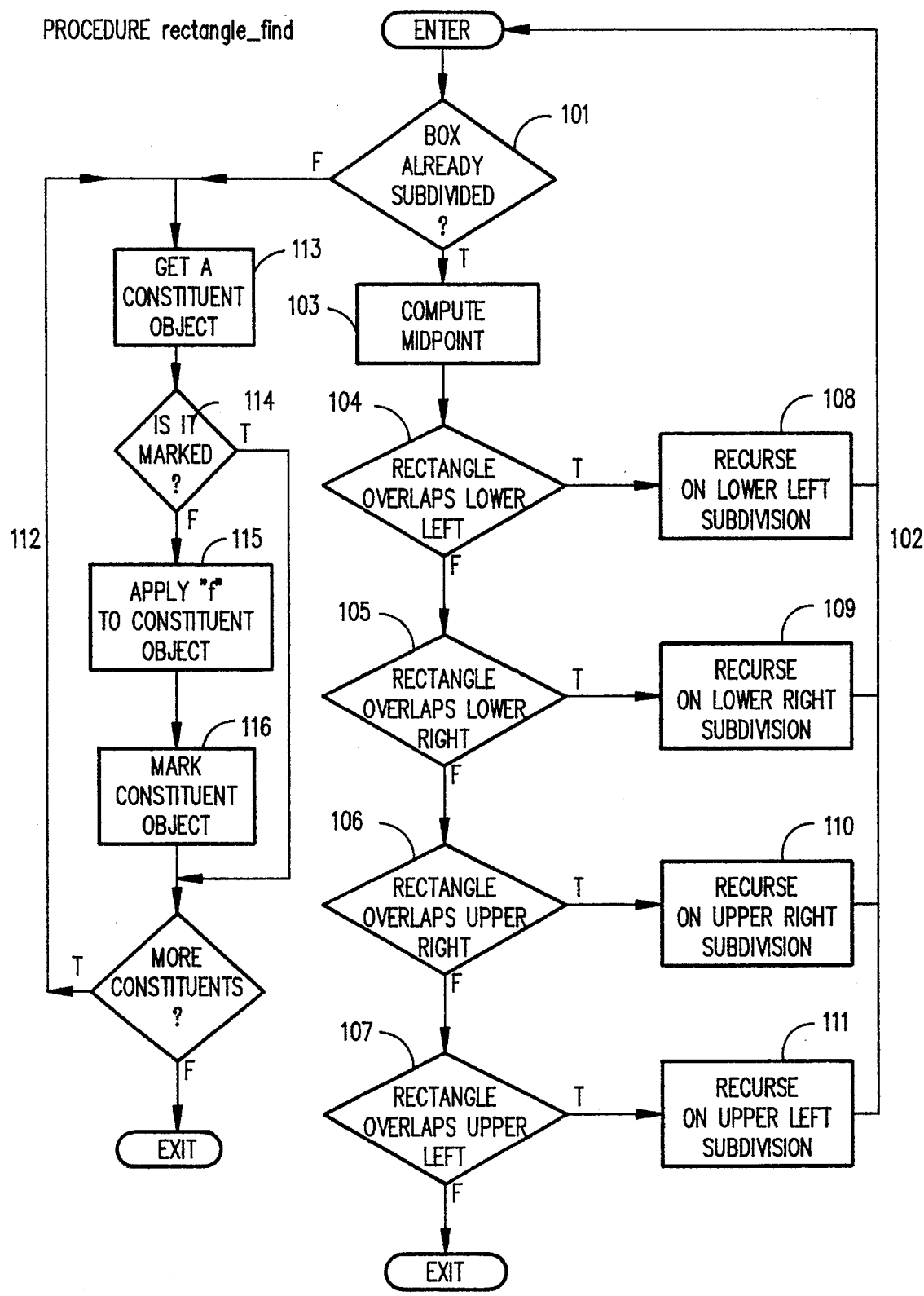
FIG. 6 is a flow chart for PROCEDURE rectangle_find.

The preferred embodiment logic for finding all objects within the bounds of a given rectangle (target characteristic) and applying a designated procedure to them is set forth below in PROCEDURE rectangle_find. A flowchart representation of PROCEDURE rectangle_find is set forth in FIG. 6. Referring to FIG. 6, PROCEDURE rectangle_find begins at 101 with the subdivision of the current box into the smallest box containing at least one of the sought-after objects. The subdivision process is designated generally by 102, and includes: finding the midpoint of the current box at 103; reducing the current box to a quadrant in which at least one of the sought-after objects lies at 104-111; and recursing on PROCEDURE rectangle_find until the smallest box object "processed" at 116; and finally repeating 112 until all constituent objects have been processed and marked.

Once an indivisible quadrant has been found and processed according to the above procedure, one level of recursion is vacated and 104-111 is re-entered in search of another indivisible quadrant containing at least one of the sought-after objects. The process is continued, recursing on PROCEDURE rectangle_find and vacating levels of recursion, until all indivisible quadrants containing at least one of the sought-after objects have been found and processed as required by procedure "f".

```
PROCEDURE rectangle_find(f, cur_xmin, cur_ymin,
                cur_xmax, cur_ymax,
                rct_xmin, rct_ymin
```

```
                              rct_xmax, rct_ymax)
****************************************************
* PURPOSE:    Apply the procedure "f" to all of the object within the
*             bounds of the rectangle (rct_xmin, rct_ymin, rct_xmax, rct_ymax).
*             The bounds of the current node are (xmin, ymin, xmax, ymax).
* INPUT:      the function, rectangle boundary, and node boundary
* OUTPUT:     None
* EFFECTS:    Applies "f" to all objects in all nodes that overlap the rectangle.
****************************************************
        IF (current box is a subdivision) THEN
* find midpoint of current box
            xmid = (cur_xmin + cur_xmax) / 2
            ymid = (cur_ymin + cur_Wax) / 2
* recurse on each quadrant that overlaps the rectangle
            IF (the rectangle overlaps rectangle (xmin, ymin, xmid, ymid)) THEN
                CALL rectangle_find(f, xmin, ymin, xmid, ymid,
                     rct xmin, rct ymin, rct xmax, rct ymax)
            ENDIF
            IF (the rectangle overlaps rectangle (xmin, ymid, xmid, ymax)) THEN
                CALL rectangle_find(f, xmin, ymid, xmid, ymax
                     rct_xmin, rct_ymin, rct_xmax, rct_ymax)
            ENDIF
            IF (the rectangle overlaps rectangle (xmid, ymin, xmax, ymid)) THEN
                CALL rectangle_find(f, xmid, ymin, xmax, ymid,
                     rct_xmin, rct_ymin, rct_xmax, rct_ymax)
            ENDIF
            IF (the rectangle overlaps rectangle (xmid, ymid, xmax, ymax)) THEN
                CALL rectangle_find(f, xmid, ymid, xmax, ymax,
                     rct_xmin, rct_ymin, rct_xmax, rct_ymax)
            ENDIF
        ELSE
* this node is a leaf node, apply "f" to each element.
*       Objects are marked to insure that "f" will be applied exactly once
*       to each object in the selected nodes. (Initially, all objects are
*       not marked.)
            REPEAT for each constituent object
                get constituent_object
                IF (constituent_object is not already marked) THEN
                    CALL f(constituent_object)
                    mark constituent_object
                ENDIF
            ENDREPEAT
        ENDIF
ENDPROCEDURE rectangle_find
```

Dynamic Selection

The spacial query technique of the present invention has applicability to a variety of display management functions requiring dynamic (rapid) selection of graphical objects. This set of functions includes those requiring dynamic preselection of graphical objects, such as preselection of the object nearest the cursor prior to actual manipulation of the object by a user, where the purpose of such preselection is to speed user turnaround time in the event the nearest object is actually selected by the user.

One application is for dynamic selection of the graphical object nearest the cursor (query target) as a user moves the cursor about the display screen by way of a mouse or other cursor control means. In this application, PROCEDURE nearest_object is called to find the graphical object nearest the cursor's present position. Upon return, the object provided can be identified to the user by any of a number of means well known in the art, including highlighting, offset, blinking, thickness change, style change, outlining, inverse video, attachment of handles, appearance of name or attributes, arrows, pointing fingers, replication into a box, displacement to an offset location, halo, color change, or marquee (animating the pixels within the object, animating a marker or markers that move along the object, or outlining the object and animating the pixels of the outline).

Another application is for dynamic selection of the graphical object nearest a given point (query target) in response to a request from the computer system. The procedure is similar to that described above for dynamic selection in response to cursor movement, except the search point is provided by the system rather than the cursor. The object provided may be identified graphically as described above, or further processed (e.g. removed, enlarged, elongated, inverted) according to any system-provided function.

Another application is for dynamic selection of multiple objects crossed by the cursor (target characteristic) as a user moves the cursor about the display screen. In this application, PROCEDURE retangle_find is called based on parameters identifying cursor movement over a given period of time. Upon return, the objects provided can be identified to the user or processed according to any system-provided function, as described above in connection with dynamic selection of single graphical objects.

Another application is for dynamic selection of all objects in a given region or window (target characteristic). In this application, PROCEDURE rectangle_find is called based on parameters identifying the boundary of the window. Upon return, the objects provided can be identified to the user or processed according to any system-provided function, as described above in connection with dynamic selection of single graphical objects.

Another application is for dynamically regenerating portions of a raster image, such as regenerating objects when an obscuring window is removed, or regenerating objects damaged by the addition of an overlapping object or window (target characteristic). In this application, PROCEDURE retangle_find is called based on parameters identifying the boundary of the obscuring window or the overlapping object or window. Upon return, the objects provided are selectively redrawn on the raster display; the needless redraw of unaffected objects is avoided.

Another application is for dynamic selection of intersections of objects (query target or target characteristic). In this application, PROCEDURE nearest_object is called based on the location of a given object. Upon return, the nearest object provided is compared with the given object to determine whether the objects intersect. Alternatively, PROCEDURE rectangle_find may be called to return all objects in the vicinity of the given object. Then each object provided is compared with the given object to determine whether the objects intersect.

Many additional applications exist for spacial queries. In fact, any display management process requiring dynamic selection of geometrical objects will benefit from spacial organization of the underlying graphics database and the resulting spacial query capability of the present invention. Thus, while the invention has been particularly described and illustrated with reference to a preferred embodiment, it will be understood by those skilled in the art that changes in the description or illustrations may be made with respect to form or detail without departing from the spirit and scope of the invention. Accordingly, the present invention is to be considered as encompassing all modifications and variations coming within the scope defined by the following claims.

What is claimed is:

1. A computer implemented method for selecting from a group of spatially organized graphical objects within a graphics space contained in a memory in a computer, one of said graphical objects having a target characteristic, wherein said graphics space is divided into quadrants and wherein each quadrant may be subdivided into quadrants, and wherein a portion of said memory corresponds to each of said quadrants, and wherein each of said graphical objects is stored in one of said corresponding portions of said memory which corresponds to a location within said graphics space of each one of said graphical objects, said method comprising the steps of:

(a) locating a cursor in said graphics space;

(b) selecting a quadrant in which said cursor is located;

(c) determining whether said selected quadrant has been subdivided;

(d) in response to said selected quadrant being subdivided, selecting a quadrant which is a subdivided portion of said selected quadrant in which said cursor is located and thereafter repeating steps (c) through (d); and (e) in response to said selected quadrant being undivided, selecting a graphical object in said selected quadrant that is closest in physical proximity to said cursor located within said graphics space.

2. A computer implemented method as recited in claim 1 wherein said computer has a display, and wherein said method further comprises the step of:

(f) providing a visual indicia within said display associated with said selected object.

3. A computer implemented method as recited in claim 2 wherein said visual indicia includes any of highlighting said selected object, offsetting said selected object, blinking said selected object, changing a thickness of said selected object, changing a style of said selected object, outlining said selected object, inverting video of said selected object, attaching handles to said selected object, displaying a name of said selected object, displaying attributes of said selected object, displaying arrows near said selected object, displaying a pointing finger near said selected object, replicating said selected object into a box, displacing said selected object to an offset location, displaying a halo around said selected object, changing a color of said selected object, and displaying a marquee around said selected object.

* * * * *

UNITED STATES PATENT AND TRADEMARK OFFICE
CERTIFICATE OF CORRECTION

PATENT NO. : 5,459,831
DATED : October 17, 1995
INVENTOR(S) : Brewer et al.

It is certified that error appears in the above-indentified patent and that said Letters Patent is hereby corrected as shown below:

Column 9, line 10: change "ymid = (cur_ymin + cur_Wax) / 2" to
--ymid = (cur_ymin + cur_ymax) / 2--

Column 12, line 23: after "object" add
--satisfies said target characteristic.--

Signed and Sealed this

Seventeenth Day of September, 1996

Attest:

BRUCE LEHMAN

*Attesting Officer*     *Commissioner of Patents and Trademarks*